United States Patent
Suzuki et al.

(10) Patent No.: US 8,650,460 B2
(45) Date of Patent: Feb. 11, 2014

(54) ELECTRONIC APPARATUS, METHOD OF CORRECTING DETECTION DATA, AND SENSOR UNIT

(75) Inventors: Satoshi Suzuki, Tokyo (JP); Norikazu Oizumi, Tokyo (JP)

(73) Assignee: Mitsumi Electric Co., Ltd., Tokyo (JP)

(*) Notice: Subject to any disclaimer, the term of this patent is extended or adjusted under 35 U.S.C. 154(b) by 192 days.

(21) Appl. No.: 13/229,792

(22) Filed: Sep. 12, 2011

(65) Prior Publication Data

US 2012/0233515 A1 Sep. 13, 2012

(30) Foreign Application Priority Data

Sep. 13, 2010 (JP) ................................. 2010-204409

(51) Int. Cl.
*G11C 29/00* (2006.01)

(52) U.S. Cl.
USPC ........................... 714/763; 714/755; 714/774

(58) Field of Classification Search
USPC .................. 714/763, 755, 752, 761, 774, 804
See application file for complete search history.

(56) References Cited

U.S. PATENT DOCUMENTS

| | | | | |
|---|---|---|---|---|
| 7,138,926 | B2* | 11/2006 | Henry et al. | 340/693.5 |
| 7,623,659 | B2* | 11/2009 | Huang et al. | 380/44 |
| 8,345,123 | B2* | 1/2013 | Sugimori | 348/231.1 |

FOREIGN PATENT DOCUMENTS

| | | |
|---|---|---|
| JP | 62-218813 | 9/1987 |
| JP | 06-160100 | 6/1994 |

* cited by examiner

*Primary Examiner* — Fritz Alphonse
(74) *Attorney, Agent, or Firm* — IPUSA, PLLC

(57) ABSTRACT

An electronic apparatus includes a sensor unit including a sensing device and configured to transmit detection data acquired with the sensing device; a computing device configured to receive the detection data and compute the corrected value of the detection data; and a memory containing, together with identification information, correction information for computing the corrected value A characteristic of the corrected value is switched by the computing device switching, in accordance with the identification information contained in the memory, a correcting operation method for computing the corrected value using the correction information contained in the memory.

5 Claims, 20 Drawing Sheets

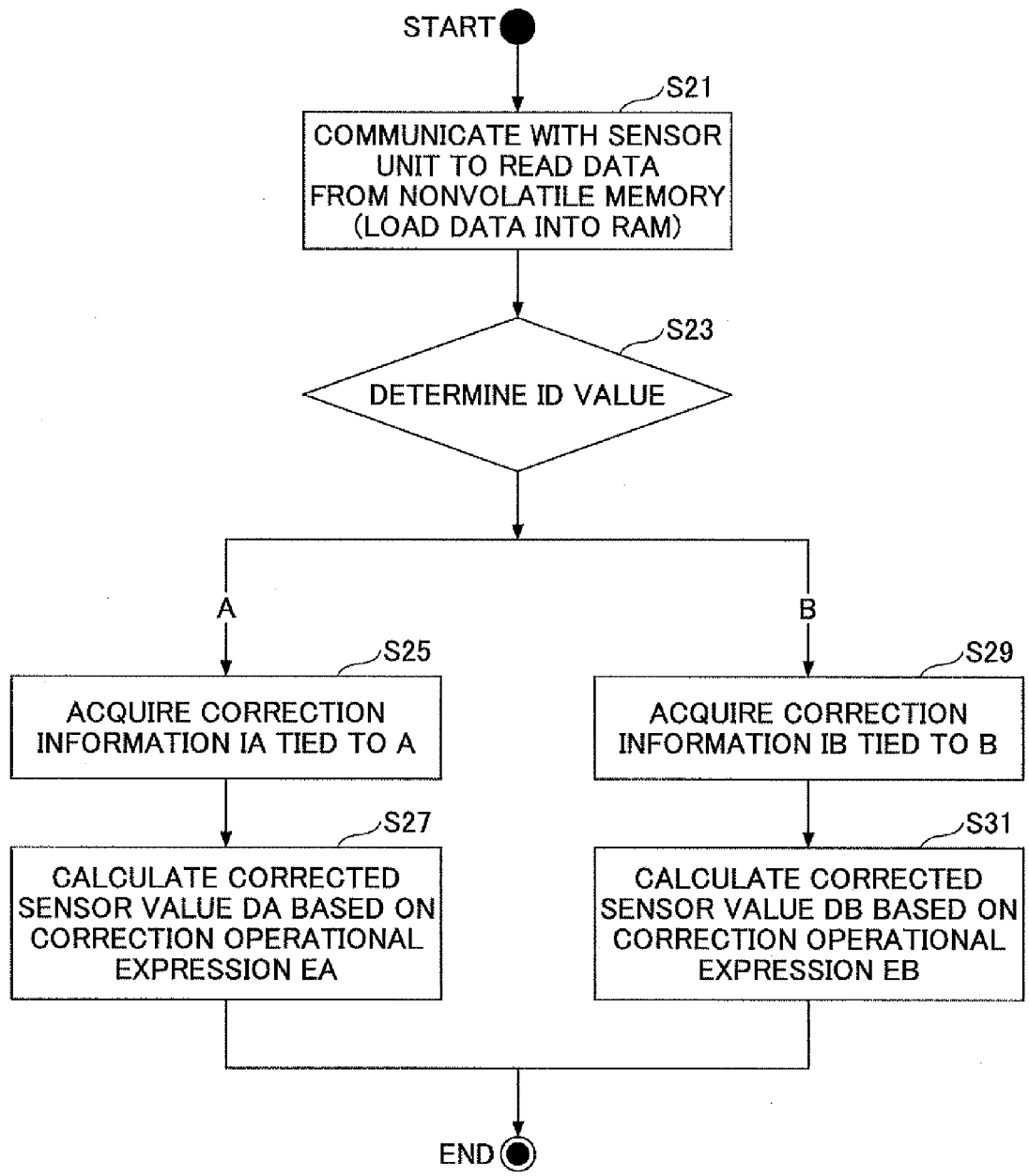

FIG.6

```
int sens_comp;          // SENSOR SENSITIVITY CORRECTION VARIABLE
int sens_temp_comp;     // SENSOR SENSITIVITY TEMPERATURE CHARACTERISTIC CORRECTION VARIABLE
int ofs_comp;           // SENSOR OFFSET CORRECTION VARIABLE
int ofs_temp_comp;      // SENSOR OFFSET TEMPERATURE CHARACTERISTIC CORRECTION VARIABLE
char id;                // ID STORAGE VARIABLE
int temp_data;          // VARIABLE INDICATING TEMPERATURE
int sensor_output;      // SENSOR OUTPUT DATA AFTER CORRECTION id = mem[5]; // ASSUME THAT DATA OF NONVOLATILE MEMORY ARE READ IN ADVANCE INTO mem ARRAY
             //    THAT IS GLOBAL VARIABLE if(id == "A"){
    sens_comp = (((int)mem[0]) << 8) | ((int)mem[1]);
    sens_temp_comp = (((int)mem[2]) << 16) | (((int)mem[3]) << 8) | ((int)mem[4]);
    ofs_comp = 0; // NO CORRECTION INFORMATION
    ofs_temp_comp = 0; // NO CORRECTION INFORMATION
}else if(id == "B"){
    sens_comp = 0; // NO CORRECTION INFORMATION
    sens_temp_comp = 0; // NO CORRECTION INFORMATION
    ofs_comp = (((int)mem[0]) << 8) | ((int)mem[1]);
    ofs_temp_comp = (((int)mem[2]) << 16) | (((int)mem[3]) << 8) | ((int)mem[4]);
} temp_data = get_temperature(); //ACQUIRE PRESENT TEMPERATURE

// PERFORM CORRECTING OPERATION USING CORRECTION VARIABLES
sensor_output
   = get_compensated_data(sens_comp, sens_temp_comp, ofs_comp, ofs_temp_comp, temp_data);
```

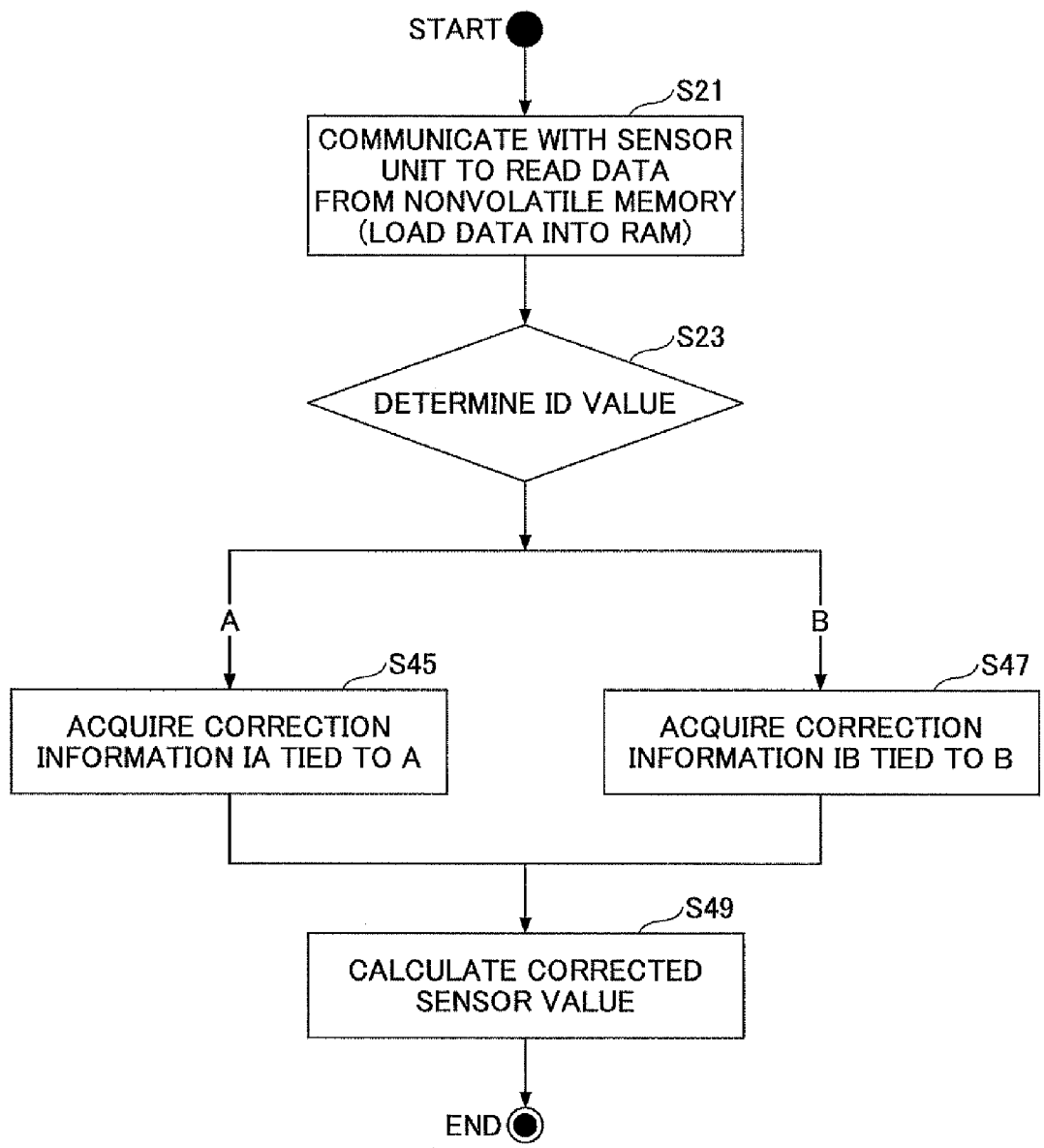

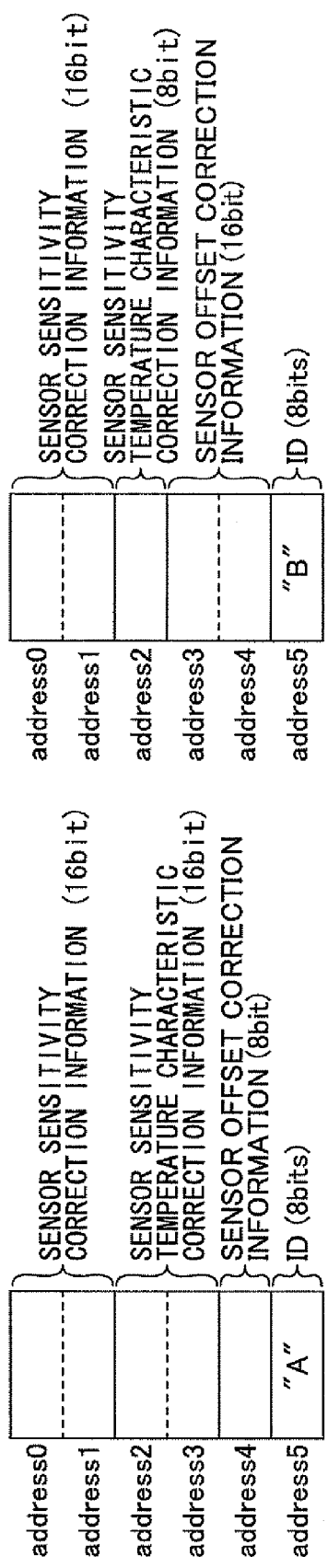

FIG.17 RELATED ART
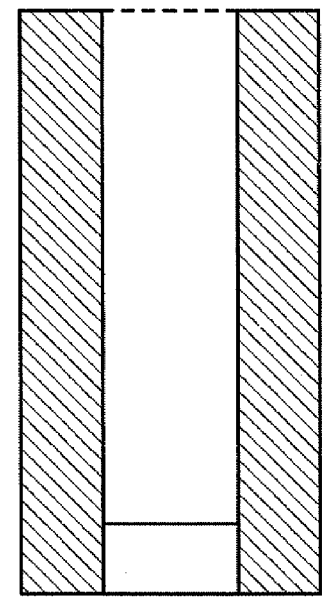
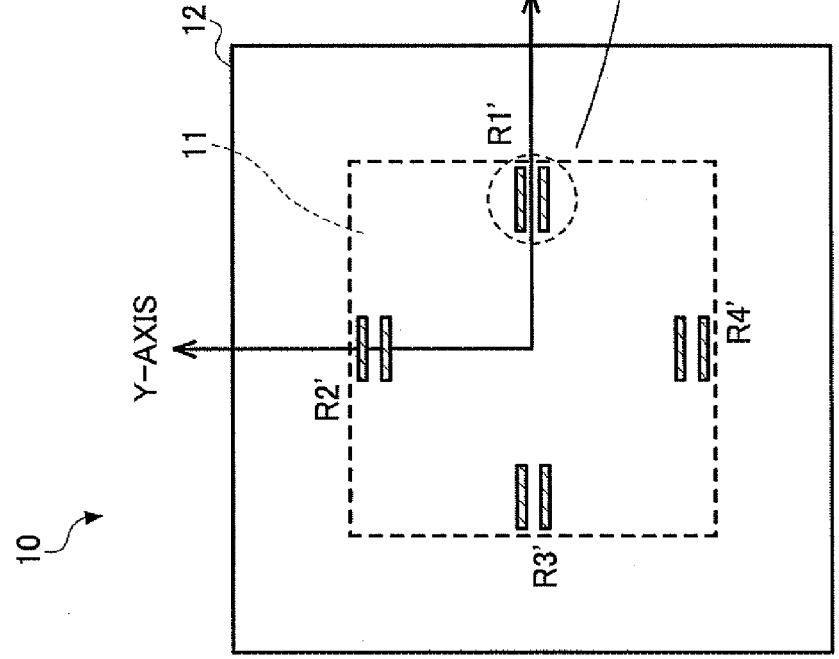

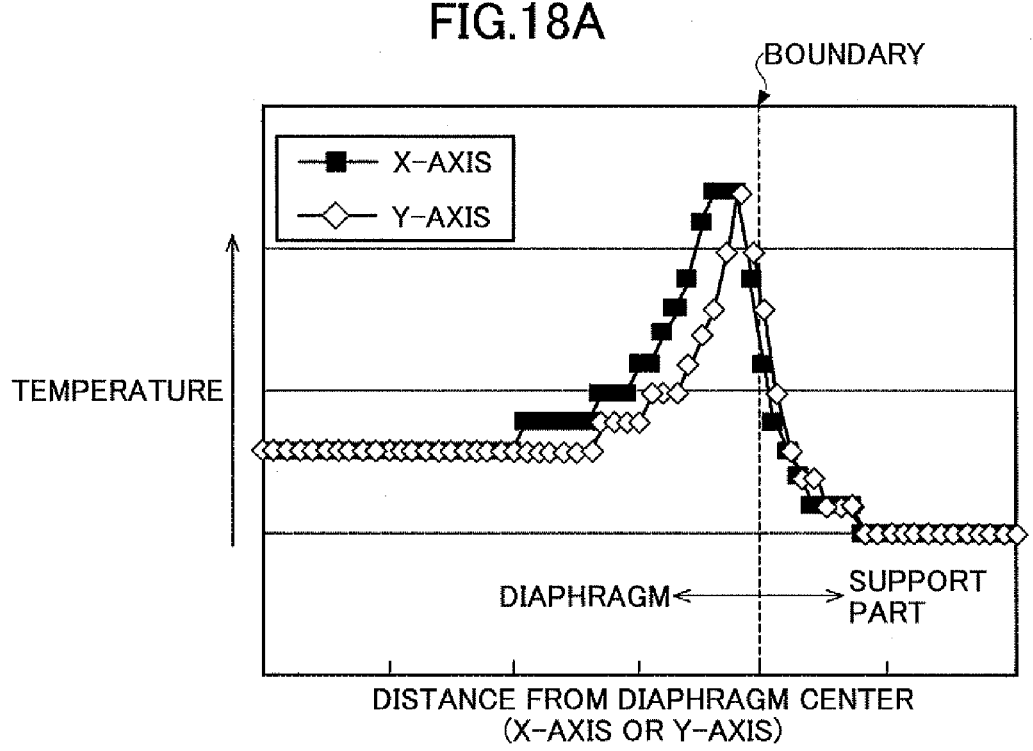
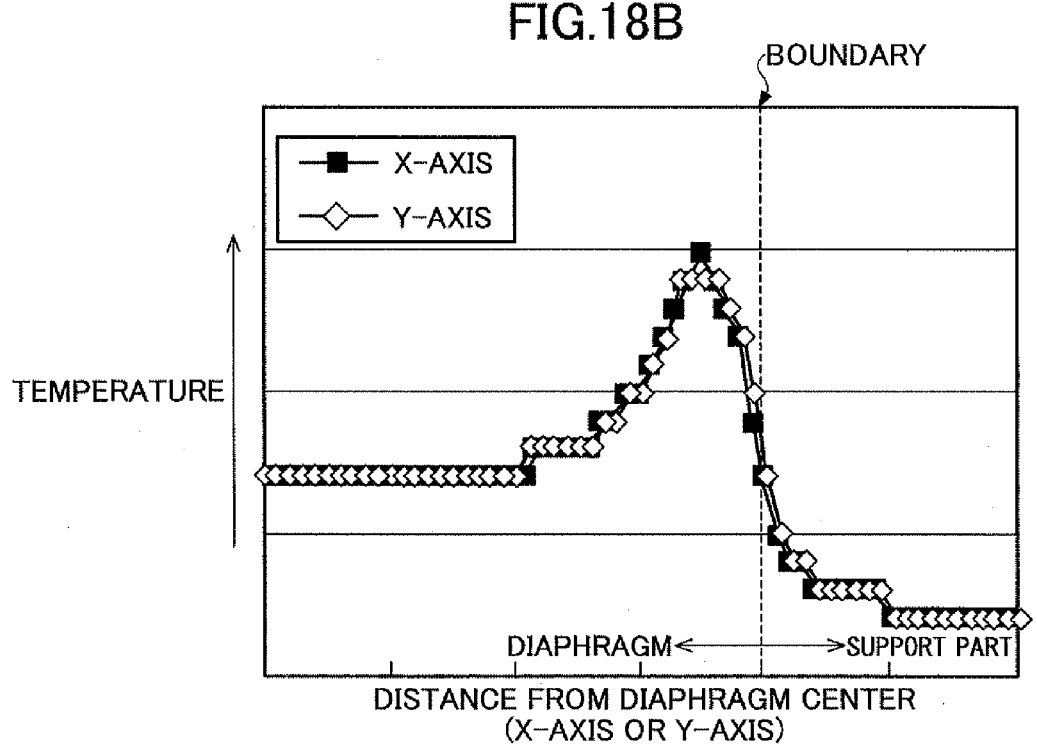

ELECTRONIC APPARATUS, METHOD OF CORRECTING DETECTION DATA, AND SENSOR UNIT

CROSS-REFERENCE TO RELATED APPLICATION

The present application is based upon and claims the benefit of priority of Japanese Patent Application No. 2010-204409, filed on Sep. 13, 2010, the entire contents of which are incorporated herein by reference.

BACKGROUND OF THE INVENTION

1. Field of the Invention

The present invention relates to an electronic apparatus, a method of correcting detection data, and a sensor unit that use correction information for computing the corrected value of detection data acquired with a sensing device.

2. Description of the Related Art

FIG. 1 is a diagram illustrating a hardware configuration of a conventional electronic apparatus 1. The electronic apparatus 1, which includes a microcomputer 70, has a sensor unit 60 as its component. The sensor unit 60 has a nonvolatile memory 63 containing correction information for computing the corrected value of detection data acquired with a sensing device 61. The microcomputer 70 is a computing device that computes the corrected value of the detection data acquired with the sensing device 61 using the correction information read from the nonvolatile memory 63.

The correction information is predetermined on a sensing device basis because of variations in detection data among sensing devices. Before the sensor unit 60 is shipped as a component of the electronic apparatus 1, the correction information is written to the nonvolatile memory 63 with the data writer of a manufacturer of the sensor unit 60 or the like. Thereafter, the sensor unit 60, shipped as a component of the electronic apparatus 1, and the microcomputer 70 are assembled as components of the electronic apparatus 1 in the manufacturing process of the electronic apparatus 1.

FIG. 2 is a flowchart of a conventional correcting operation program executed by a central processing unit (CPU) 74 of the microcomputer 70. In step S11, the CPU 74 of the microcomputer 70 communicates with the sensor unit 60 to read data contained in the nonvolatile memory 63 included in the sensor unit 60 and load the read data into a RAM 72. Then, in step S13, the CPU 74 of the microcomputer 70 obtains the correction information in accordance with the memory map of the nonvolatile memory 63 provided in advance from the manufacturer of the sensor unit 60. In step S15, by performing an operation for correcting detection data acquired from the sensor unit 60 using the obtained correction information based on a prescribed correction operational expression, the CPU 74 of the microcomputer 70 calculates the corrected value of the detection data (corrected sensor value).

For example, there are Japanese Laid-Open Patent Application No. 6-160100 and Japanese Laid-Open Patent Application No. 62-218813 as prior art documents related to correcting operations similar to the one described above.

SUMMARY OF THE INVENTION

According to an aspect of the present invention, an electronic apparatus includes a sensor unit including a sensing device and configured to transmit detection data acquired with the sensing device; a computing device configured to receive the detection data and compute a corrected value of the detection data; and a memory containing, together with identification information, correction information for computing the corrected value, wherein a characteristic of the corrected value is switched by the computing device switching, in accordance with the identification information contained in the memory, a correcting operation method for computing the corrected value using the correction information contained in the memory.

According to an aspect of the present invention, a method of correcting detection data includes receiving detection data acquired with a sensing device; and computing a corrected value of the detection data, wherein a characteristic of the corrected value is switched by switching a correcting operation method for computing the corrected value using correction information for computing the corrected value in accordance with identification information read from a memory containing the correction information.

According to an aspect of the present invention, a sensor unit includes a sensing device; a memory containing, together with identification information, correction information for computing a corrected value of detection data by a computing device receiving the detection data, the detection data being acquired with the sensing device; and a transmission part configured to transmit the detection data and the correction information and the identification information contained in the memory so that a characteristic of the corrected value is switched by the computing device switching, in accordance with the identification information contained in the memory, a correcting operation method for computing the corrected value using the correction information contained in the memory.

BRIEF DESCRIPTION OF THE DRAWINGS

Other objects, features and advantages of the present invention will become more apparent from the following detailed description when read in conjunction with the accompanying drawings, in which:

FIG. 4 is a flowchart of a correcting operation program in the case where an ID is tied to each of correction information and a correction operational expression according to the first embodiment of the present invention;

FIG. 6 illustrates a correcting operation program written in the C language according to the first embodiment of the present invention;

FIG. 7 is a flowchart of the correcting operation program in the case where the ID is tied only to the correction information according to the first embodiment of the present invention;

FIGS. 8A and 8B are diagrams illustrating second examples of the memory map of the nonvolatile memory according to the first embodiment of the present invention;

FIG. 17 is a diagram illustrating a structure of a conventional piezoresistive pressure sensor, where (a) is a plan view illustrating an overall configuration and (b) is a plan view illustrating an arrangement of piezoresistive elements in a piezoresistance part;

FIGS. 18A and 18B are graphs illustrating temperature distribution simulation results according to the fourth embodiment of the present invention, where FIG. 18A is a graph illustrating the temperature distribution of the conventional piezoresistive pressure sensor and FIG. 18B is a graph illustrating the temperature distribution of the piezoresistive pressure sensor of the fourth embodiment;

FIG. 19A is a graph illustrating the offset voltage variation of the conventional piezoresistive pressure sensor and FIG. 19B is a graph illustrating the offset voltage variation of the piezoresistive pressure sensor of the fourth embodiment;

DETAILED DESCRIPTION OF THE PREFERRED EMBODIMENTS

However, according to the conventional techniques, although an attempt is made to provide (ship) multiple kinds of sensor units that have the same hardware configuration and are different in the kind of correction information written to the memory as components, a computing device that computes the corrected value of detection data, such as a microcomputer, is prevented from determining the type of the correction information written to the memory unless a correcting operation program is prepared for each kind of sensor unit. An increase in the number of correcting operation programs makes it difficult to manage the correcting operation programs.

According to an aspect of the present invention, it is possible to provide multiple kinds of sensor units that have the same hardware configuration and are different in the kind of correction information written to a memory without preparing a correcting operation program for each kind of sensor unit. Further, according to an aspect of the present invention, an electronic apparatus, a method of correcting detection data, and a sensor unit are provided that may obviate the necessity of preparing a correcting operation program for each kind of sensor unit.

Figure 1:
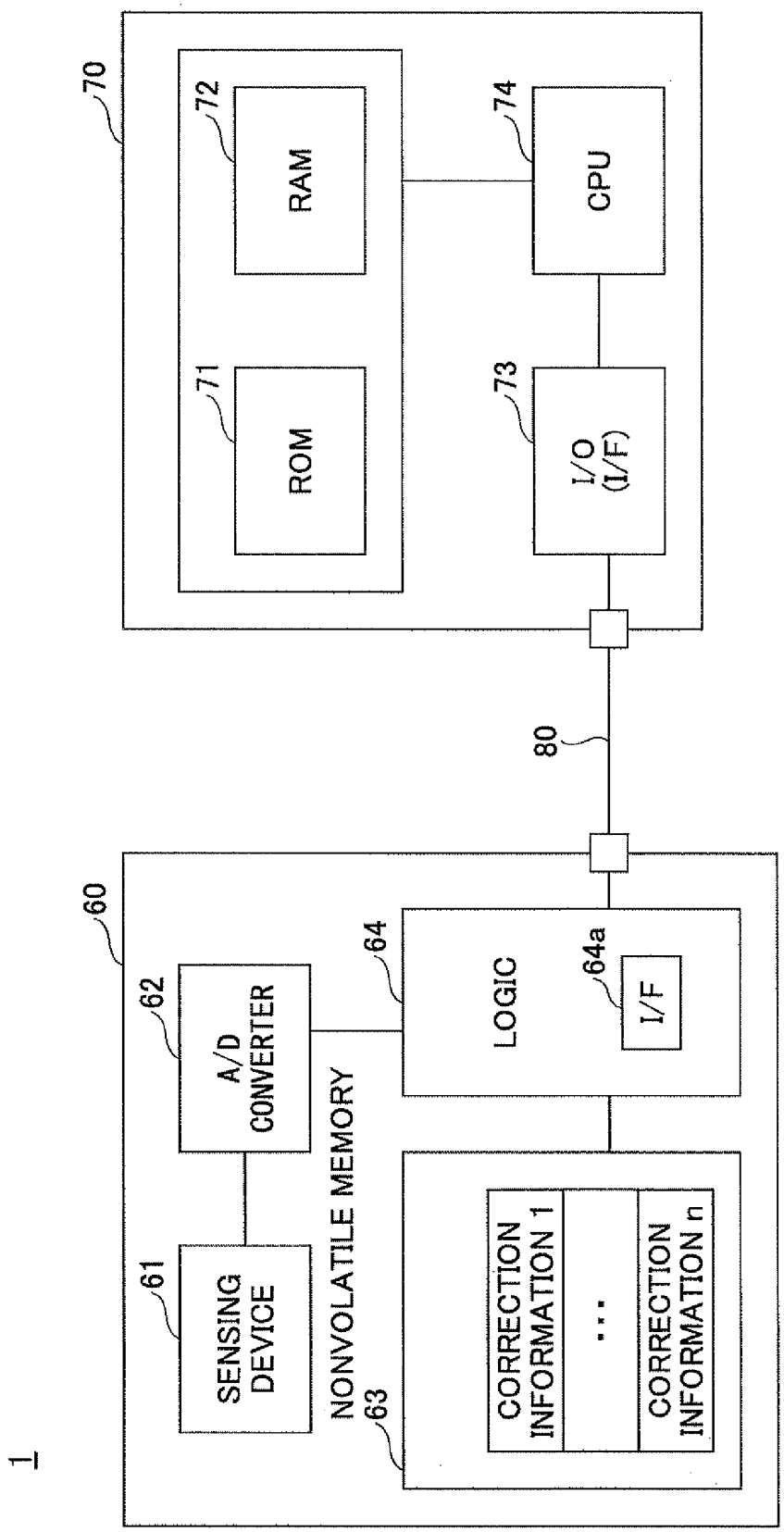
FIG. 1 is a diagram illustrating a hardware configuration of a conventional electronic apparatus.
Figure 2:
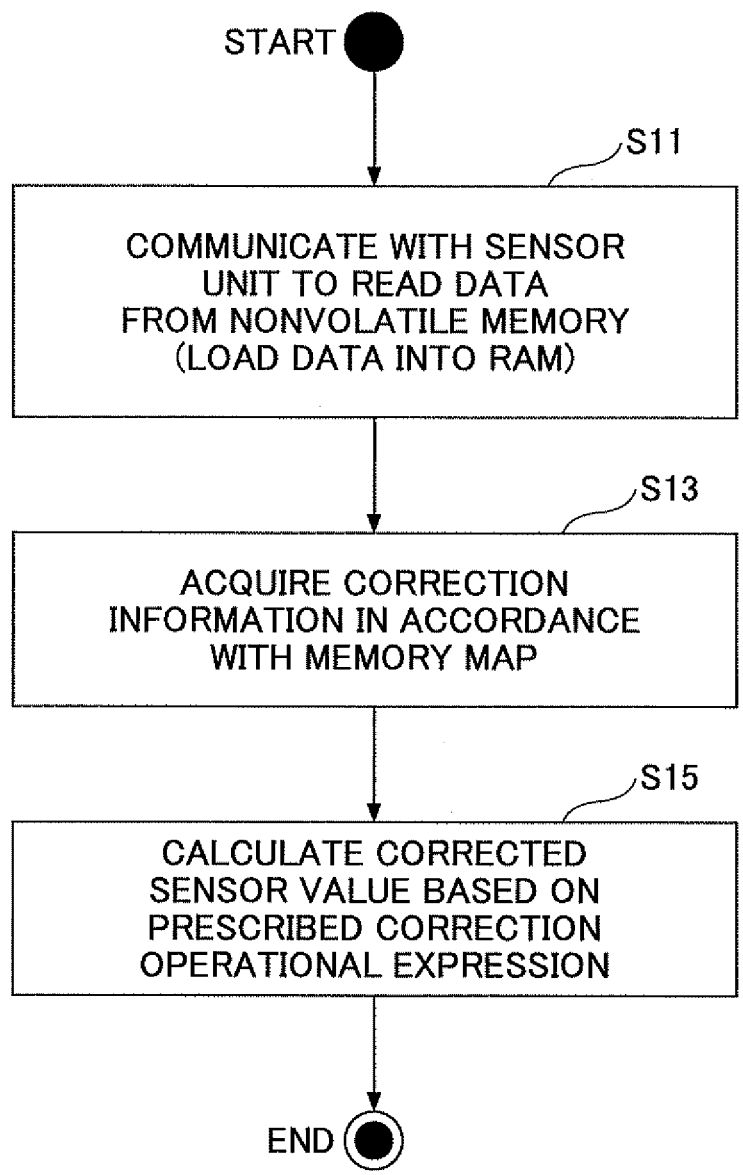
FIG. 2 is a flowchart of a conventional correcting operation program.
Figure 3:
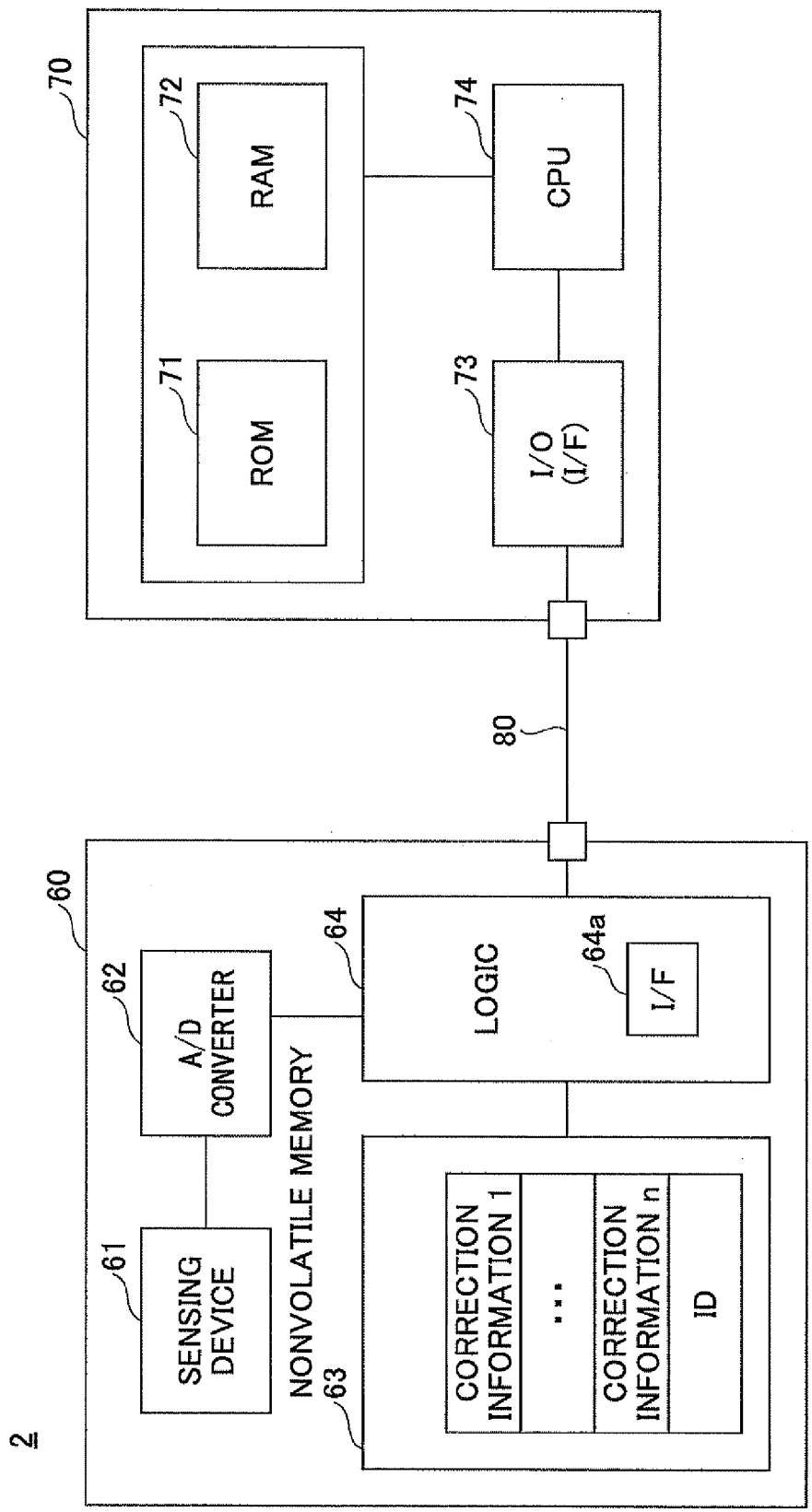
FIG. 3 is a diagram illustrating a hardware configuration of an electronic apparatus according to a first embodiment of the present invention.

A description is given below, with reference to the accompanying drawings, of embodiments of the present invention. In the following embodiments, the same elements as those illustrated in FIG. 1 are referred to by the same reference numerals. FIG. 3 is a diagram illustrating a hardware configuration of an electronic apparatus 2 according to a first embodiment of the present invention. Like the electronic apparatus 1 illustrated in FIG. 1, the electronic apparatus 2 including the microcomputer 70 has the sensor unit 60 as its component. The sensor unit 60 has the nonvolatile memory 63 containing correction information for computing the corrected value of detection data acquired with the sensing device 61. The microcomputer 70 is a computing device that computes the corrected value of the detection data acquired with the sensing device 61 using the correction information read from the nonvolatile memory 63. The microcomputer 70 is connected to the sensor unit 60 via a communication line 80 in such a manner as to enable communications with the sensor unit 60.

The sensor unit 60 is a module product including the sensing device 61 that converts the physical quantity or chemical quantity of an object of detection into an analog electrical signal, an analog-to-digital (AD) converter 62 that converts the analog electrical signal output by the sensing device 61 into a digital signal, the nonvolatile memory 63 that contains correction information for computing the corrected value of the detection data acquired with the sensing device 61, and a logic circuit 64 including an interface (I/F) circuit 64a that transmits data contained in the nonvolatile memory 63 and the digital signal output from the AD converter 62 to the outside.

Specific examples of the nonvolatile memory 63 include an electrically erasable/programmable read-only memory (EEPROM). The correction information stored in the nonvolatile memory 63, which is information for computing a corrected sensor value, is information for keeping an error included in the detection data acquired with the sensing device 61 within a predetermined range. The error is caused by at least variations in the sensing characteristics of the sensing device 61. Examples of the sensing characteristics of the sensing device 61 include a sensitivity characteristic, an offset characteristic, a drift characteristic, a temperature characteristic, a frequency characteristic, and linearity of the sensing device 61.

The detection data acquired with the sensing device 61 include an error due to variations in the sensing characteristics of the sensing device 61 and an error due to a variation in the AD conversion characteristic of the AD converter 62. The variations differ between sensor units. Accordingly, the correction information is predetermined on a sensor unit basis and is written to the nonvolatile memory 63.

That is, the correction information enables correction of sensing characteristics characteristic of each sensing device (or sensor unit).

Further, the nonvolatile memory 63 contains an ID as identification information together with the correction information. The ID is a data item directly or indirectly tied to (correlated with) the kind of the correction information and/or the kind of a correction operational expression to be described below. Specific examples of the ID include a serial number, a symbol, a letter, a manufacturing time, and a manufacturing number.

The correction information and the ID are written to the nonvolatile memory 63 with the data writer of a manufacturer of the sensor unit 60 or the like before the sensor unit 60 is shipped as a component of the electronic apparatus 2. Thereafter, the sensor unit 60 shipped as a component of the electronic apparatus 2 is attached as a component of the electronic apparatus 2, together with the microcomputer 70, to the built-in board of the electronic apparatus 2 in the manufacturing process of the electronic apparatus 2.

Accordingly, if each kind of correction information is assigned a different ID, the microcomputer 70 is allowed to recognize (determine) the kind of the correction information contained in the nonvolatile memory 63 by reading the ID before performing a correcting operation. Further, if each kind of correction operational expression is assigned a different ID, the microcomputer 70 is allowed to recognize (determine) the kind of a correction operational expression based on which to compute a corrected value by reading the ID before performing a correcting operation.

The data (that is, the correction information and the ID) contained in the nonvolatile memory 63 and the digital signal output from the AD converter 62 (that is, the detection data detected with the sensing device 61) are transmitted to the microcomputer 70 via the communication line 80 by a transmission part (the I/F circuit 64*a*) of the logic circuit 64. The data transmitted from the transmission part may be transmitted to the microcomputer 70 directly or via a predetermined circuit. The communication line 80 is, for example, an interconnection pattern of the board. The transmission part of the logic circuit 64 transmits the data including the correction information according to a communications system such as I2C or SPI. The data transmitted from the transmission part are transmitted to the CPU 74 via a reception part included in an input/output (I/O) part 73 of the microcomputer 70.

FIG. 4 is a flowchart of a correcting operation program in the case where the ID is tied to each of the correction information and the correction operational expression. This correcting operation program is prestored in a ROM 71 of the microcomputer 70 illustrated in FIG. 3, and is read and executed by the CPU 74 of the microcomputer 70.

In step S21 of FIG. 4, the CPU 74 of the microcomputer 70 communicates with the sensor unit 60 to receive detection data acquired with the sensing device 61, read data contained in the nonvolatile memory 63 included in the sensor unit 60, and load the read data into the RAM 72. Then, the CPU 74 of the microcomputer 70 acquires correction information and an ID in accordance with the memory map of the nonvolatile memory 63 provided in advance by the manufacture of the sensor unit 60.

As illustrated in the flowchart of FIG. 4, the correcting operation method for computing the corrected value of the detection data acquired with the sensing device 61 is switched in accordance with the value of the ID. In step S23, the CPU 74 of the microcomputer 70 determines the value of the ID. If the value of the ID is A, a correcting operation logic LA, which is a sequence on the left side in FIG. 4, is selected. If the value of the ID is B, a correcting operation logic LB, which is a sequence on the right side in FIG. 4, is selected. That is, the correcting operation logic LA and the correcting operation logic LB are included in advance in the correcting operation program.

Accordingly, if the value of the ID is A, in step S25, the CPU 74 of the microcomputer 70 acquires correction information IA tied to A from the RAM 72, and in step S27, calculates the corrected value of the detection data acquired with the sensing device 61 (corrected sensor value) DA by performing a correcting operation using the correction information IA based on a correction operational expression EA tied to A. On the other hand, if the value of the ID is B, in step S29, the CPU 74 of the microcomputer 70 acquires correction information IB tied to B from the RAM 72, and in step S31, calculates the corrected value of the detection data acquired with the sensing device 61 (corrected sensor value) DB by performing a correcting operation using the correction information IB based on a correction operational expression EB tied to B.

Figure 5A:
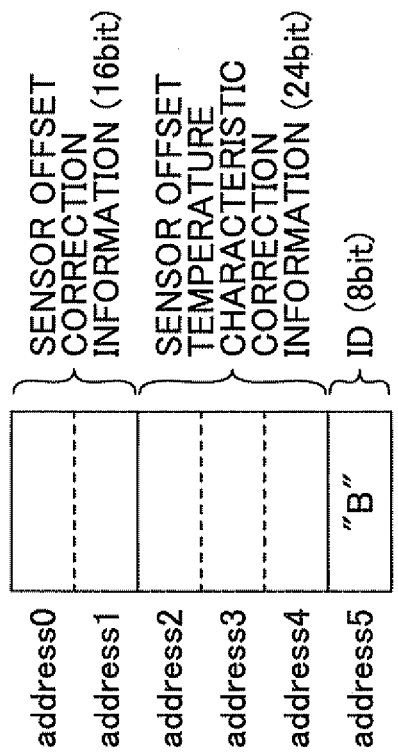
FIGS. 5A and 5B are diagrams illustrating first examples of a memory map of a nonvolatile memory according to the first embodiment of the present invention.
Figure 5B:
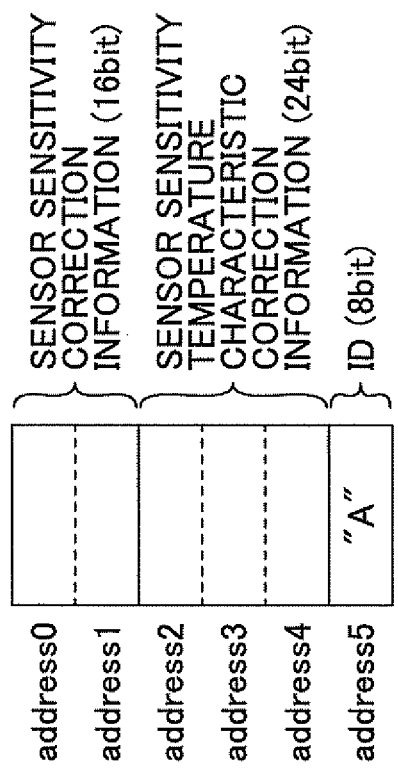

FIGS. 5A and 5B are diagrams illustrating first examples of the memory map of the nonvolatile memory 63, whose data storage area per address is 8 bits. The CPU 74 of the microcomputer 70 acquires the correction information and the ID in accordance with the memory map allocated in advance as graphically illustrated by the manufacturer of the sensor unit 60. If the address of the ID retained in the nonvolatile memory 63 is common to multiple kinds of memory maps, the kind of the memory map may be recognized (determined) on the CPU 74 side. If the value of Address 5 of the nonvolatile memory 63, that is, ID, is A, it is possible to recognize on the CPU 74 side that sensor sensitivity correction information is contained in Addresses 0 and 1 and sensor sensitivity temperature characteristic correction information is contained in Addresses 2-4 in the nonvolatile memory 63 as illustrated in FIG. 5A. Likewise, if the value of Address 5 of the nonvolatile memory 63, that is, ID, is B, it is possible to recognize on the CPU 74 side that sensor offset correction information is contained in Addresses 0 and 1 and sensor offset temperature characteristic correction information is contained in Addresses 2-4 in the nonvolatile memory 63 as illustrated in FIG. 5B.

Accordingly, it is possible for the microcomputer 70 to calculate a corrected sensor value extremely limited in sensitivity variations independent of ambient temperature if the acquired ID is A, and to calculate a corrected sensor value extremely limited in offset variations independent of ambient temperature if the acquired ID is B.

That is, by providing a configuration such that the characteristic of a corrected sensor value is switched in accordance with a correcting operation program having the logic of switching a correcting operation method with an ID as illustrated in FIG. 4, it is possible to provide multiple kinds of sensor units that have the same hardware configuration and are different in the kind of the correction information written to a memory without preparing a correcting operation program for each kind of sensor unit. That is, using a correcting operation program common to multiple kinds of sensor units as illustrated in FIG. 4 makes it possible to switch the characteristic of a corrected sensor value in accordance with the purpose of use of the corrected sensor value even when multiple kinds of sensor units are provided that have the same hardware configuration and are different in the kind of the correction information written to a memory.

Further, after the shipment of the sensor units as well, it is possible to change or improve operation speed, operation accuracy, etc., by changing or updating the contents of the correcting operation program common to the sensor units.

On the other hand, without such an ID as described above, it is necessary to prepare the correction information and the correcting operation program on a one-to-one basis, thus preventing a common correcting operation program from being used. Further, once sensor units having different kinds of correction information are mixed, there is no way to recognize the difference later because the sensor units are the same in regard to hardware.

FIG. 6 illustrates a correcting operation program written in the C language. In the case of FIG. 6, the correcting operation method is switched using an if-else statement. As illustrated in FIG. 6, a variable read from the nonvolatile memory 63 to be stored in a register is switched in accordance with the ID. Therefore, even when there are multiple kinds of variables to be stored in the register, it is possible to use a common correcting operation program.

The ID may not be tied to the correction operational expression, and may be tied only to the correction information. FIG. 7 is a flowchart of the correcting operation program in the case where the ID is tied only to the correction information. In FIG. 7, the same steps as those of FIG. 4 are referred to by the same step numbers, and a description thereof is omitted.

In the case of FIG. 7, if the value of the ID is A, in step S45, the CPU 74 of the microcomputer 70 acquires the correction information IA tied to A, and in step S49, calculates the corrected sensor value by performing a correcting operation using the correction information IA based on a predetermined correction operational expression that remains unchanged irrespective of the value of the ID. On the other hand, if the value of the ID is B, in step S47, the CPU 74 of the microcomputer 70 acquires the correction information IB tied to B, and in step S49, calculates the corrected sensor value by performing a correcting operation using the correction information IB based on the same correction operational expression as in the case where the value of the ID is A.

FIGS. 8A and 8B are diagrams illustrating second examples of the memory map of the nonvolatile memory 63, whose data storage area per address is 8 bits. The CPU 74 of the microcomputer 70 acquires the correction information and the ID in accordance with the memory map allocated in advance as graphically illustrated by the manufacturer of the sensor unit 60. In the case of the memory maps of FIGS. 8A and 8B, the data capacity of the sensor sensitivity temperature characteristic correction information is 16 bits if the ID is A, and is 8 bits if the ID is B. The sensor sensitivity temperature characteristic correction information is contained in Addresses 2 and 3 if the ID is A, and is contained in Address 2 if the ID is B. Further, the data capacity of the sensor offset correction information is 8 bits if the ID is A, and is 16 bits if the ID is B. The sensor offset correction information is contained in Address 4 if the ID is A, and is contained in Addresses 3 and 4 if the ID is B.

With respect to the correcting operation, the same correcting operation program may be used even between different IDs if, for example, 8-bit information is converted into data corresponding to 16 bits by performing an 8-bit shifting operation.

Accordingly, it is possible for the microcomputer 70 to calculate a corrected sensor value lower in offset characteristic correction accuracy and higher in sensor sensitivity temperature characteristic correction accuracy if the acquired ID is A, and to calculate a corrected sensor value higher in offset characteristic correction accuracy and lower in sensor sensitivity temperature characteristic correction accuracy if the acquired ID is B.

Figure 9:
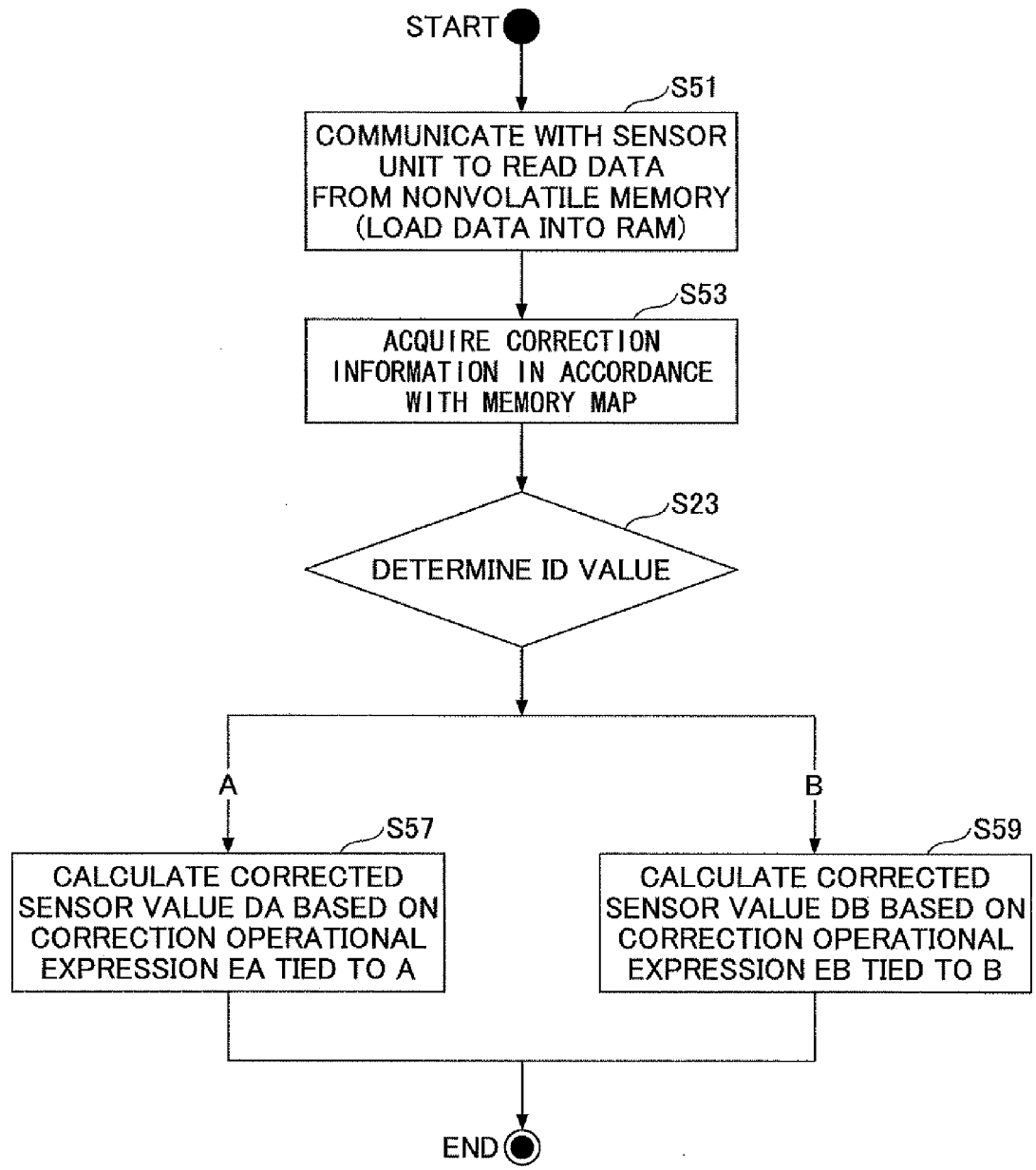
FIG. 9 is a flowchart of the correcting operation program in the case where the ID is tied only to the correction operational expression according to the first embodiment of the present invention.

Further, the ID may not be tied to the correction information, and may be tied only to the correction operational expression. FIG. 9 is a flowchart of the correcting operation program in the case where the ID is tied only to the correction operational expression. In FIG. 9, the same steps as those of FIG. 4 are referred to by the same step numbers, and a description thereof is omitted.

In the case of FIG. 9, in step S51, the CPU 74 of the microcomputer 70 communicates with the sensor unit 60 to receive detection data acquired with the sensing device 61, read data contained in the nonvolatile memory 63 included in the sensor unit 60, and load the read data into the RAM 72. Then, in step S53, the CPU 74 of the microcomputer 70 acquires correction information and an ID in accordance with the memory map of the nonvolatile memory 63 provided in advance by the manufacture of the sensor unit 60. This memory map is a predetermined map that remains unchanged irrespective of the value of the ID. If the value of the ID is A, in step S57, the CPU 74 of the microcomputer 70 calculates the corrected sensor value DA by performing a correcting operation using the correction information acquired in step S53 based on the correction operational expression EA tied to A. On the other hand, if the value of the ID is B, in step S59, the CPU 74 of the microcomputer 70 calculates the corrected sensor value DB by performing a correcting operation using the correction information acquired in step S53 based on the correction operational expression EB tied to B.

Figure 10:
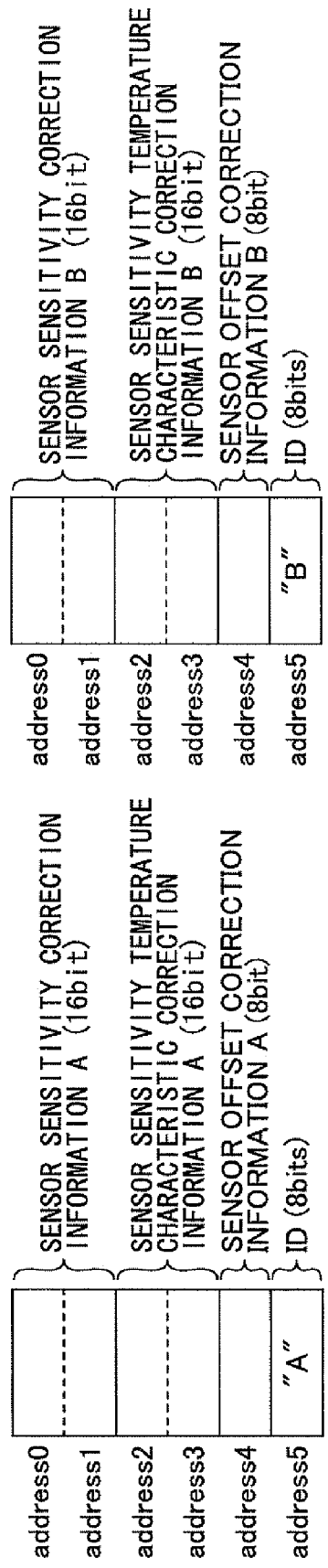
FIGS. 10A and 10B are diagrams illustrating third examples of the memory map of the nonvolatile memory according to the first embodiment of the present invention.

FIGS. 10A and 10B are diagrams illustrating third examples of the memory map of the nonvolatile memory 63, whose data storage area per address is 8 bits. The CPU 74 of the microcomputer 70 acquires the correction information and the ID in accordance with the memory map allocated in advance as graphically illustrated by the manufacturer of the sensor unit 60. In the case of the memory maps of FIGS. 10A and 10B, the kind of the correction information is common to the case where the value of the ID is A and the case where the value of the ID is B. In this case, the microcomputer performs a correcting operation with the correction operational expression EA tied to A if the acquired ID is A, and performs a correcting operation with the correction operational expression EB tied to B if the acquired ID is B. In this case, the correction operational expression EA is higher in correction accuracy than the correction operational expression EB. Further, since higher correction accuracy results in a more complicated operation, the operation time of the correction operational expression EB is shorter than that of the correction operational expression EA.

This enables a sensor manufacturer to provide an optimum correction method in accordance with the performance or required accuracy of the microcomputer 70.

A preferred embodiment of the present invention is described in detail above. The present invention, however, is not limited to the above-described embodiment, and variations and substitutions may be made to the above-described embodiment without departing from the scope of the present invention.

Figure 11:
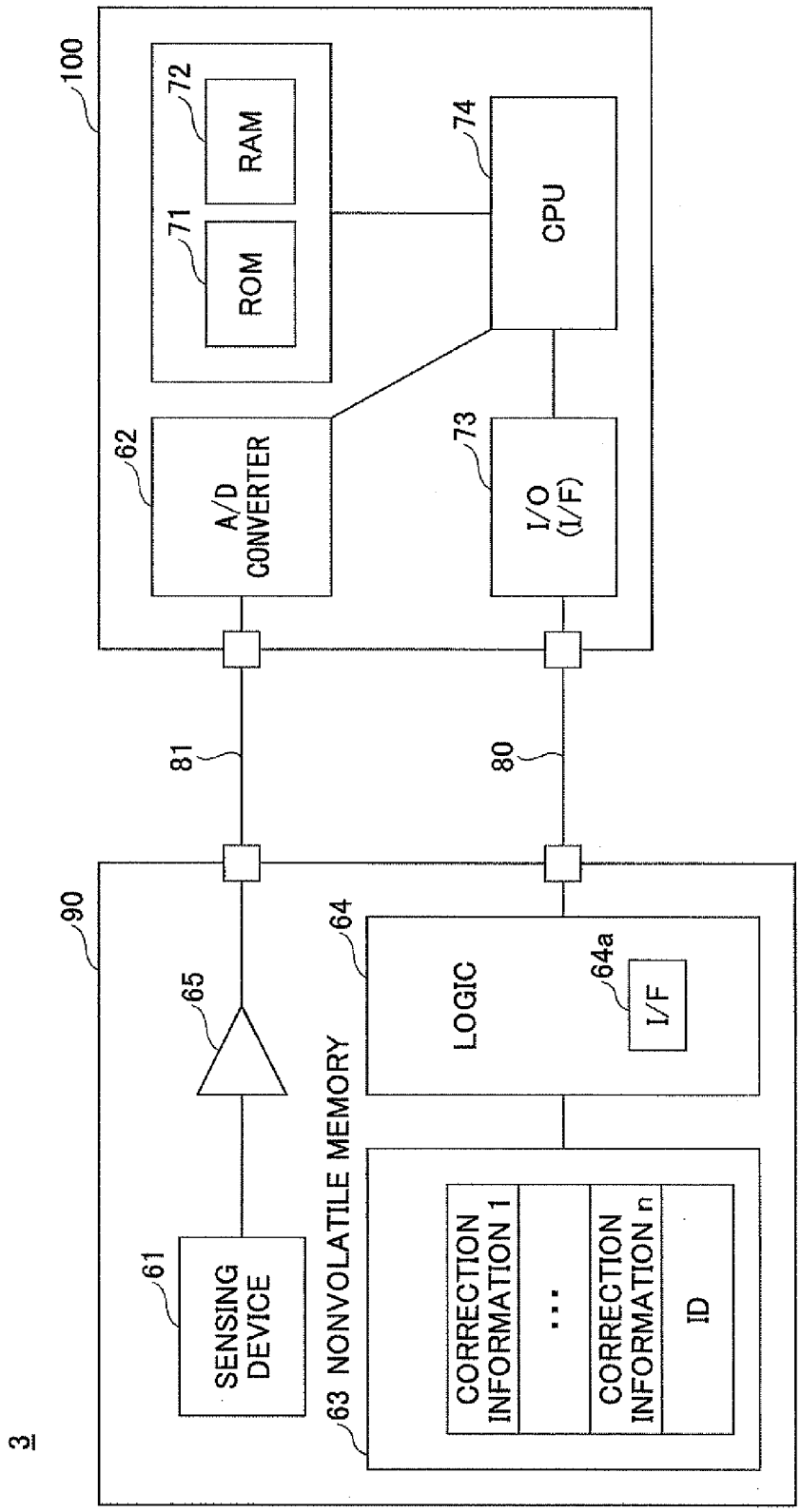
FIG. 11 is a diagram illustrating a hardware configuration of an electronic apparatus according to a second embodiment of the present invention.

FIG. 11 is a diagram illustrating a hardware configuration of an electronic apparatus 3 according to a second embodiment of the present invention. The electronic apparatus 3 includes a sensor unit 90 and a microcomputer 100 connected to the sensor unit 90 via the communication line 80 and a signal line 81. Instead of being provided in a sensor unit, the AD converter 62 may be included in an external computing device such as the microcomputer 100 as illustrated in FIG. 11 or be provided external to such a computing device. Further, the electronic apparatus 3 may include an optional amplifier 65 that amplifies analog detection data acquired with the sensing device 61 and outputs the acquired analog detection data to the AD converter 62 via the signal line 81.

Figure 12:
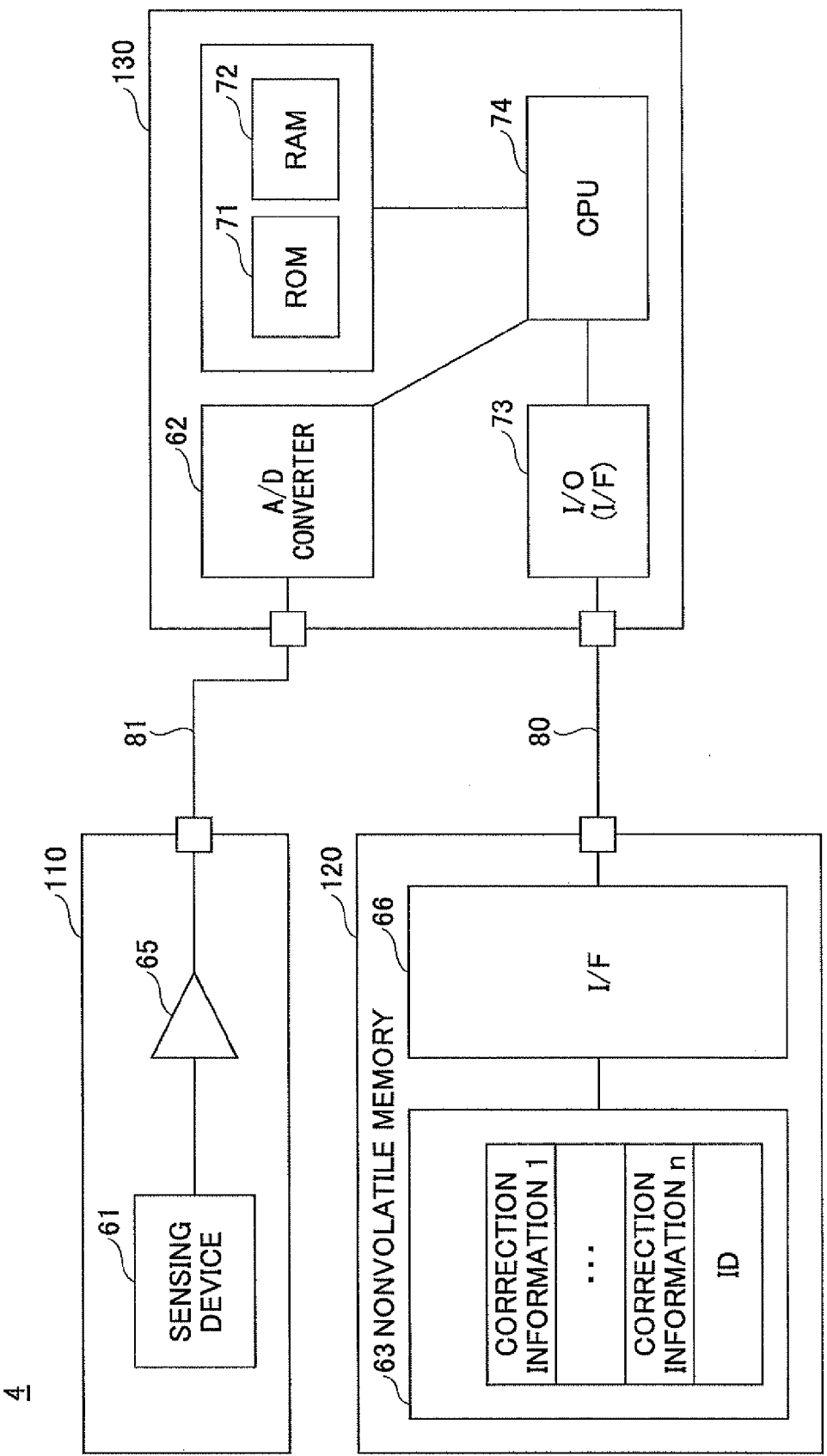
FIG. 12 is a diagram illustrating a hardware configuration of an electronic apparatus according to a third embodiment of the present invention.

FIG. 12 is a diagram illustrating a hardware configuration of an electronic apparatus 4 according to a third embodiment of the present invention. The electronic apparatus 4 includes a sensor unit 110, a memory unit 120 including an I/F circuit 66 (a transmission part), and a microcomputer 130. The nonvolatile memory 63 may not be necessarily integrated physically with a sensing device. Logically, however, a sensing device and the data of a nonvolatile memory are tied together (for example, as in the case where the sensor unit 110 and the memory unit 120 including the nonvolatile memory 63 are connected, always as a set, to the microcomputer 130). Like in the case of FIG. 11, the amplifier 65 is optional.

Further, in the above-described embodiments, two correcting operation methods are prepared, and the two correcting operation methods are switched in accordance with two IDs. However, three or more correcting operation methods may be prepared, and these three or more correcting operation methods may be switched in accordance with three or more IDs.

Further, the physical quantity or chemical quantity detected with the sensing device 61 may not be limited in particular, and may be, for example, a pressure, an acceleration, a temperature, a yaw rate, etc. Further, if the sensing device 61 is a semiconductor device in which a diaphragm is formed that detects the pressure of fluid such as gas as a pressure to be measured, the sensing device 61 may be a semiconductor strain gauge device that detects a distortion of the diaphragm as a change in a resistance value, a capacitance device that detects a displacement of the diaphragm as a change in capacitance, or a device that detects a pressure to be measured according to another detection method. If the sensing device 61 is a device that detects pressure, the electronic apparatuses 2 through 4 according to the above-described embodiments correspond to, for example, pressure gauges.

Next, a description is given of a piezoresistive pressure sensor as a specific example of the sensing device 61.

Figure 13:
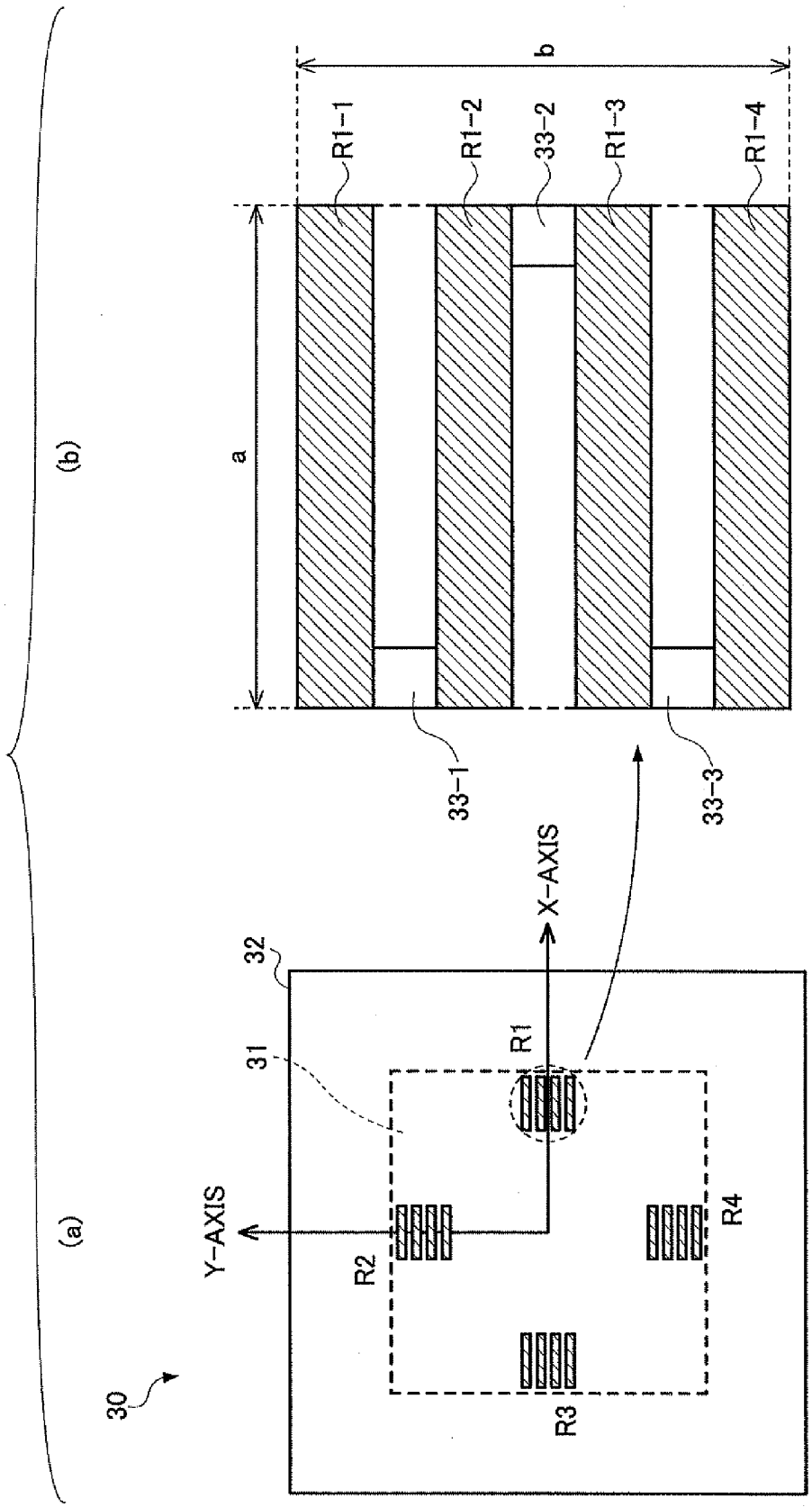
FIG. 13 is a diagram illustrating a structure of a piezoresistive pressure sensor according to a fourth embodiment of the present invention, where (a) is a plan view illustrating an overall configuration and (b) is a plan view illustrating an arrangement of piezoresistive elements in a piezoresistance part.

FIG. 13 illustrates a structure of a piezoresistive pressure sensor according to a fourth embodiment of the present invention. As illustrated in (a) of FIG. 13, a piezoresistive pressure sensor 30 includes a diaphragm 31 and a support part 32. The diaphragm 31 is supported from its periphery by the support part 32. As a result, the diaphragm 31 is configured to be displaced in accordance with an applied pressure with the periphery of the diaphragm 31 being fixed by the support part 32.

Piezoresistance parts R1, R2, R3, and R4 are placed in a peripheral edge part of the diaphragm 31 (which may be restated as "in the diaphragm 31 near its four sides" or "in the diaphragm 31 near the boundary between the diaphragm 31 and the support part 32"). Each of the piezoresistance parts R1, R2, R3, and R4 has multiple piezoresistive elements.

In FIG. 13, (b) is an enlarged view of the part encircled with a broken line in (a), and illustrates an arrangement of piezoresistive elements in the piezoresistance part R1. The piezoresistance part R1 includes four piezoresistive elements R1-1, R1-2, R1-3, and R1-4 parallel to the X-axis.

The piezoresistive elements R1-1, R1-2, R1-3, and R1-4 are arranged parallel to each other at predetermined intervals. In addition, the outline of a region where a piezoresistive element group formed of the piezoresistive elements R1-1, R1-2, R1-3, and R1-4 is placed is substantially square. That is, an X-axis side a and a Y-axis side b of the region illustrated in (b) of FIG. 13 are equal in length (a=b). In other words, the piezoresistive elements R1-1, R1-2, R1-3, and R1-4 are so arranged as to define a substantially square region together with a part where there are no piezoresistive elements between each adjacent two of the piezoresistive elements R1-1, R1-2, R1-3, and R1-4.

The piezoresistive elements R1-1, R1-2, R1-3, and R1-4 are connected in series with electrically conductive lines (such as diffusion interconnects) 33-1, 33-2, and 33-3. In (b) of FIG. 13, the right end of the piezoresistive element R1-1 and the right end of the piezoresistive element R1-4 are connected to terminals (such as aluminum interconnects) of a bridge circuit. The piezoresistance parts R2, R3, and R4 have the same arrangement of piezoresistive elements as illustrated in (b) of FIG. 13, and are equal in the area of the region defined by the piezoresistive elements and a part where there are no piezoresistive elements to the piezoresistance part R1.

Further, the piezoresistance parts R1, R2, R3, and R4 are so arranged as to be equally distant from the boundary between the diaphragm 31 and the support part 32.

Figure 14:
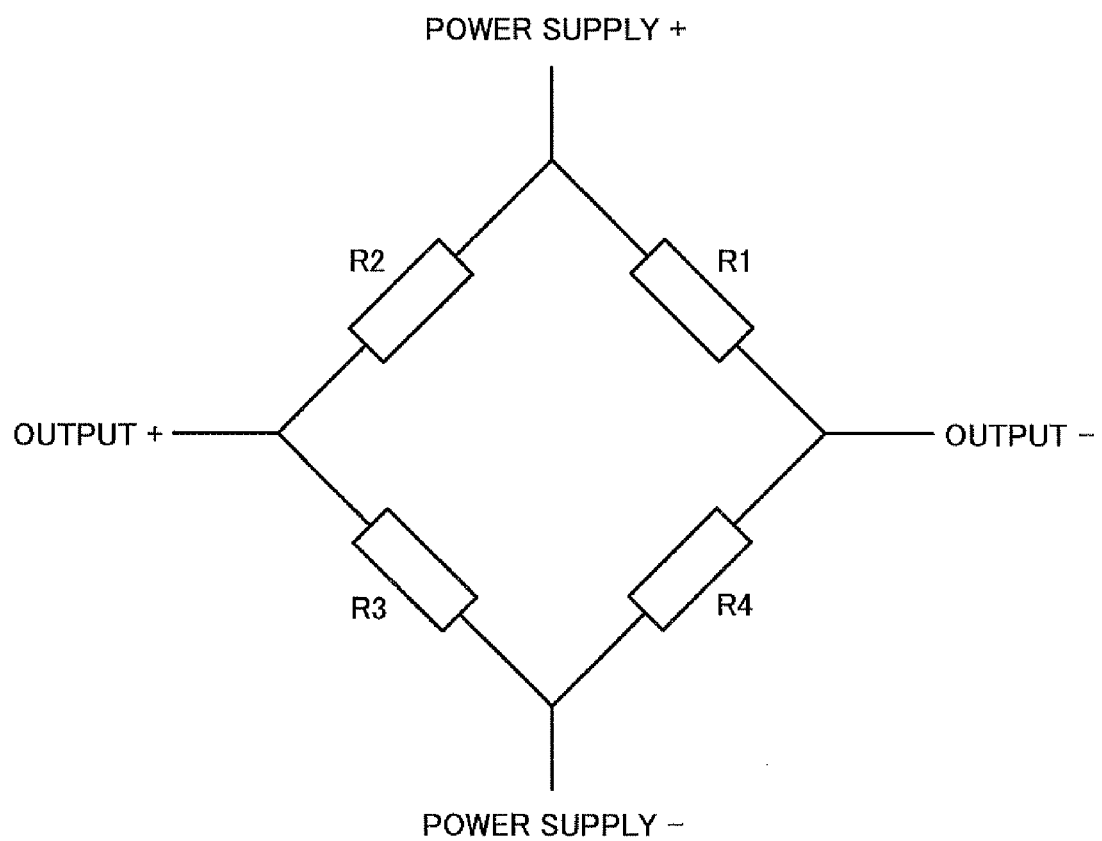
FIG. 14 is a connection diagram illustrating a bridge circuit formed of piezoresistance parts according to the fourth embodiment of the present invention.

FIG. 14 illustrates a bridge circuit formed of the piezoresistance parts R1, R2, R3, and R4. The piezoresistive elements are so arranged that adjacent two of the piezoresistance parts of the bridge circuit R1 through R4 (a pair of R1 and R3 and a pair of R2 and R4) are opposite in resistance change (that is, the piezoresistance parts R1 and R3 are equal in resistance change and the piezoresistance parts R2 and R4 are opposite in resistance change to the piezoresistance parts R1 and R3).

Figure 15:
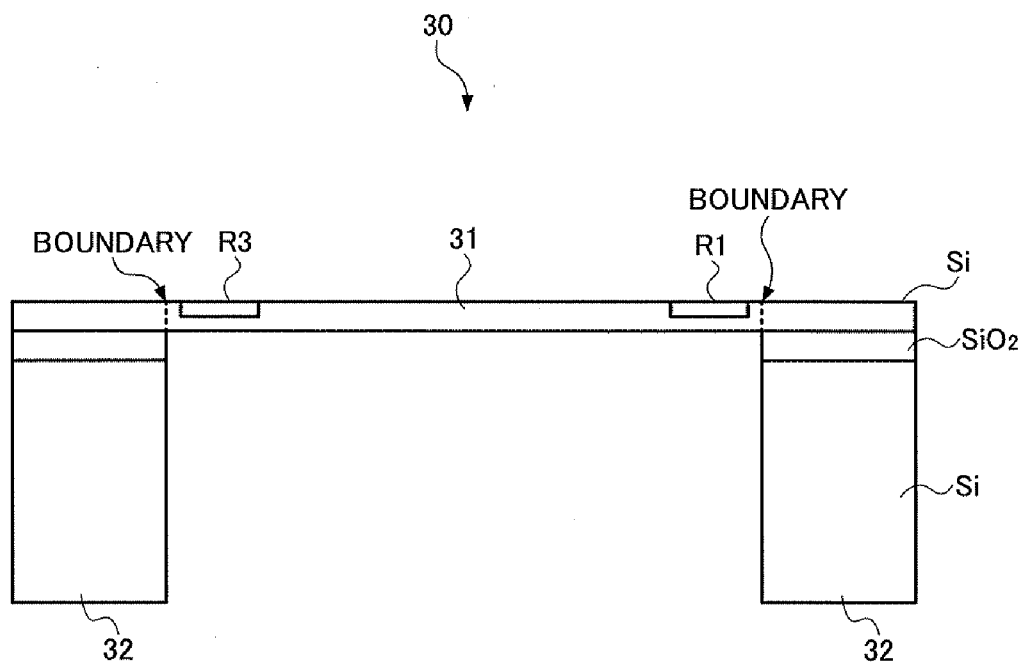
FIG. 15 is a cross-sectional view of the piezoresistive pressure sensor formed by anisotropic dry etching according to the fourth embodiment of the present invention.

FIG. 15 illustrates a cross section of the piezoresistive pressure sensor 30. FIG. 15 is a schematic cross-sectional view taken along a plane passing through the piezoresistance parts R1 and R3.

The piezoresistive pressure sensor 30 illustrated in FIG. 15 has the diaphragm 31 and the support part 32 formed by preparing a multilayer substrate of Si, $SiO_2$, and Si stacked in this order from top to bottom, removing Si by performing anisotropic dry etching from the bottom side of the substrate using $SiO_2$ as an etch stopper, and thereafter removing $SiO_2$. Further, the piezoresistance parts R1 and R3 formed of a p-type impurity such as boron are formed in the diaphragm 31 near the boundary between the diaphragm 31 and the support part 32 by a semiconductor process such as diffusion or ion implantation.

As is seen from FIG. 15, according to the piezoresistive pressure sensor 30 of this embodiment, application of anisotropic dry etching allows the support part 32 to be positioned substantially at right angles to the surface of the diaphragm 31. This allows the diaphragm 31 to be increased in area.

Figure 16:
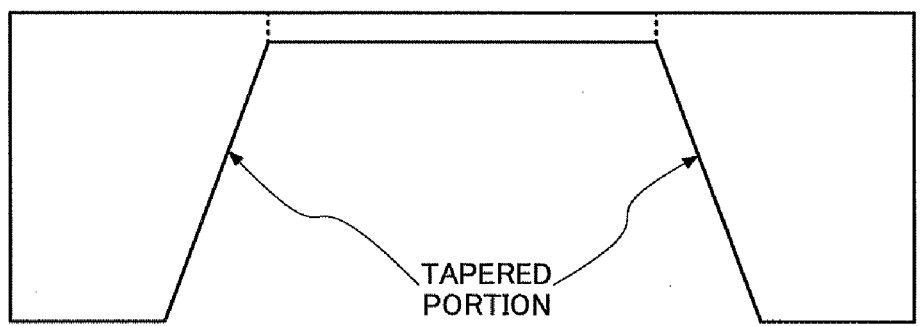
FIG. 16 is a cross-sectional view of a piezoresistive pressure sensor formed by anisotropic wet etching for comparison purposes according to the fourth embodiment of the present invention.

On the other hand, in the case of applying anisotropic wet etching, a tapered portion is formed in the support part as illustrated in FIG. 16. Therefore, compared with the case of FIG. 15, the diaphragm is reduced in area, thus resulting in a decrease in measurement sensitivity. Further, an attempt to increase the area of the diaphragm results in an increase in the size of the entire device.

That is, according to this embodiment, the piezoresistive pressure sensor 30, reduced in size and having good sensitivity, is obtained by forming the diaphragm 31 and the support part 32 by anisotropic dry etching. However, the present invention is not limited to this, and allows application of anisotropic wet etching.

Next, a description is given of an operation of the piezoresistive pressure sensor 30.

Upon application of electric current to the piezoresistance parts R1, R2, R3, and R4, the piezoresistive elements of the piezoresistance parts R1, R2, R3, and R4 generate heat, so that the piezoresistance parts R1, R2, R3, and R4 generate heat.

The heat of the piezoresistance parts R1, R2, R3, and R4 is dissipated (transferred) to the support part 32 thicker than the diaphragm 31. At this point, since the outline of the piezoresistive element group of each of the piezoresistance parts R1, R2, R3, and R4 is substantially square in the piezoresistive pressure sensor 30 of this embodiment, the heat is evenly dissipated in the X-axis direction and the Y-axis direction. As a result, the four piezoresistance parts R1, R2, R3, and R4 have the same temperature distribution.

Here, the heat is evenly dissipated in the X-axis direction and the Y-axis direction because the piezoresistance parts R1, R2, R3, and R4 have their respective portions opposed to the support part 32 equal in size. In this respect, in a piezoresistive pressure sensor 10 illustrated in FIG. 17, each of piezoresistance parts R1', R2', R3', and R4' have an outline longer in the X-axis direction and shorter in the Y-axis direction, so that a greater amount of heat is dissipated in the Y-axis direction than in the X-axis direction. As a result, according to the piezoresistive pressure sensor 10 illustrated in FIG. 1, the temperature distributions of the piezoresistance parts R1' and R3' are different from the temperature distributions of the piezoresistance parts R2' and R4'.

According to the piezoresistive pressure sensor 30 of this embodiment, since the four piezoresistance parts R1, R2, R3, and R4 have the same temperature distribution, the piezoresistance values change equally in response to a temperature increase. As a result, an offset voltage variation due to a resistance value change at a power-on time is controlled. Further, a stress change in the diaphragm 31 caused by a temperature increase is made uniform. As a result, an offset voltage variation due to a stress change at a power-on time is controlled.

According to the piezoresistive pressure sensor 30, an offset voltage variation is reduced as described above, so that an output voltage variation at a time of measuring pressure is reduced. Accordingly, it is possible to obtain highly accurate measurement results.

FIGS. 18A and 18B illustrate the results of simulating a temperature distribution on the X-axis and the Y-axis from the center of the diaphragm to the support part. FIG. 18A illustrates the temperature distribution of the conventional piezoresistive pressure sensor 10 illustrated in FIG. 17. FIG. 18B illustrates the temperature distribution of the piezoresistive pressure sensor 30 of this embodiment illustrated in FIG. 13. It is shown that while there is a difference in the temperature distribution between the X-axis and the Y-axis in the conventional piezoresistive pressure sensor 10 (FIG. 18A), there is a match in the temperature distribution between the X-axis and the Y-axis in the piezoresistive pressure sensor 30 of this embodiment (FIG. 18B).

Figure 19B:
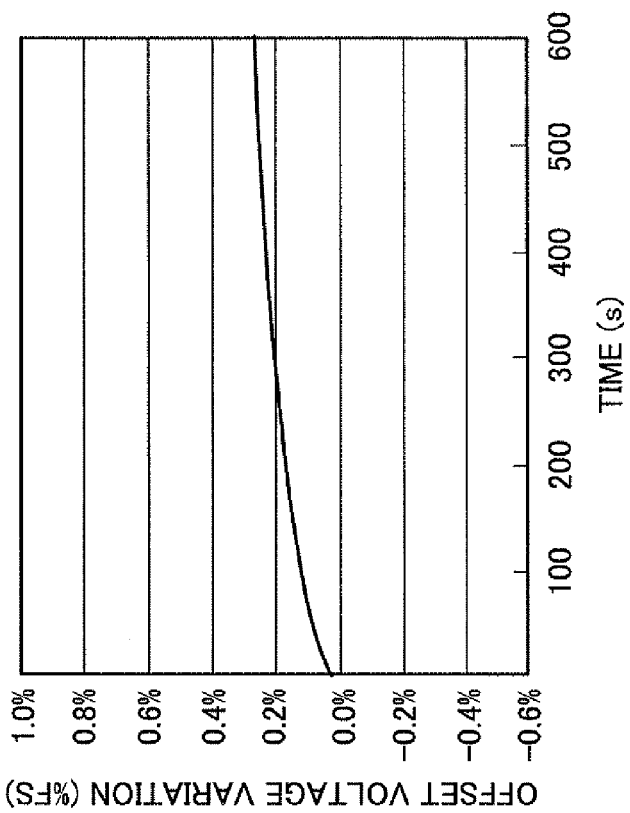
FIGS. 19A and 19B are graphs illustrating the measurement results of offset voltage variations according to the fourth embodiment of the present invention, where
Figure 19A:
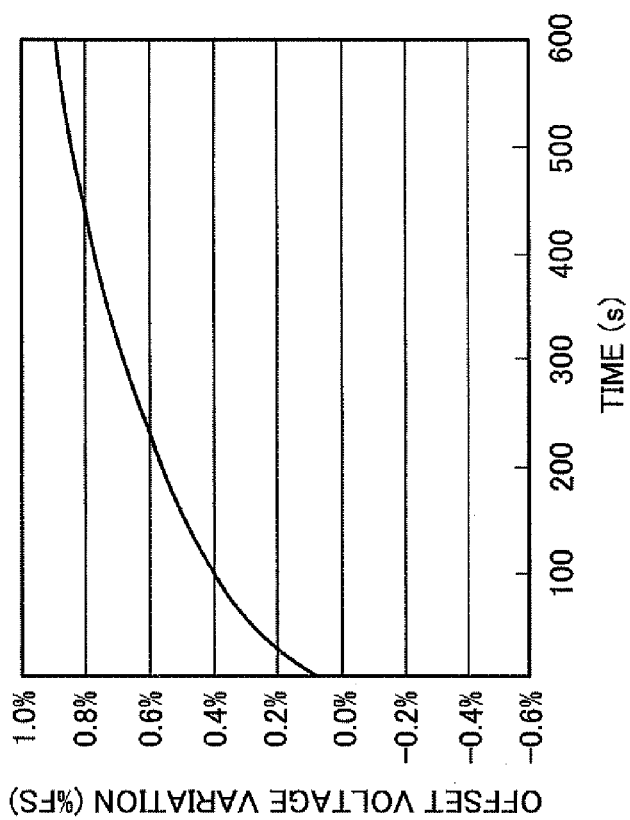

FIGS. 19A and 19B illustrate the measurement results of an offset voltage variation since the start of feeding electric current to the bridge circuit. FIG. 19A illustrates the offset voltage variation of the conventional piezoresistive pressure sensor 10 illustrated in FIG. 17. FIG. 19B illustrates the offset voltage variation of the piezoresistive pressure sensor 30 of this embodiment illustrated in FIG. 13. Compared with the offset voltage variation of the conventional piezoresistive pressure sensor 10, the offset voltage variation of the piezoresistive pressure sensor 30 is reduced. Generally, the tolerance of the offset voltage variation is approximately 0.3% FS.

As described above, according to this embodiment, the piezoresistance parts R1, R2, R3, and R4 are placed in the diaphragm 31 near the boundary between the diaphragm 31 and the support part 32, and the piezoresistive element group of each of the piezoresistance parts R1, R2, R3, and R4 has a substantially square outline. Accordingly, it is possible to control a variation at a time of current application due to the thermal variations of piezoresistive elements without reduction in measurement resistivity.

That is, the measurement sensitivity increases because the piezoresistance parts R1, R2, R3, and R4 are placed on part of the diaphragm 31 near the boundary between the diaphragm 31 and the support part 32, where the displacement of the diaphragm 31 due to a pressure change is maximized. However, the part near the boundary between the diaphragm 31 and the support part 32 is where the temperature distribution is steep, that is, the temperature of the diaphragm 31 is subject to the largest change, and accordingly, is where the unevenness of temperature among the piezoresistance parts R1, R2, R3, and R4 is most likely to appear. According to this embodiment, in consideration of this, the piezoresistive element group placement regions of the piezoresistance parts R1, R2, R3, and R4 are caused to have the same, substantially square outline, and the piezoresistance parts R1, R2, R3, and R4 are caused to be equally distant from the boundary with the support part 32. This makes it possible to make temperature uniform even when the piezoresistance parts R1, R2, R3, and R4 are placed near the boundary between the diaphragm 31 and the support part 32, where the temperature distribution is steep. As a result, a variation at a time of current application due to the thermal variations of piezoresistive elements is controlled without reduction in measurement resistivity.

Figure 20:
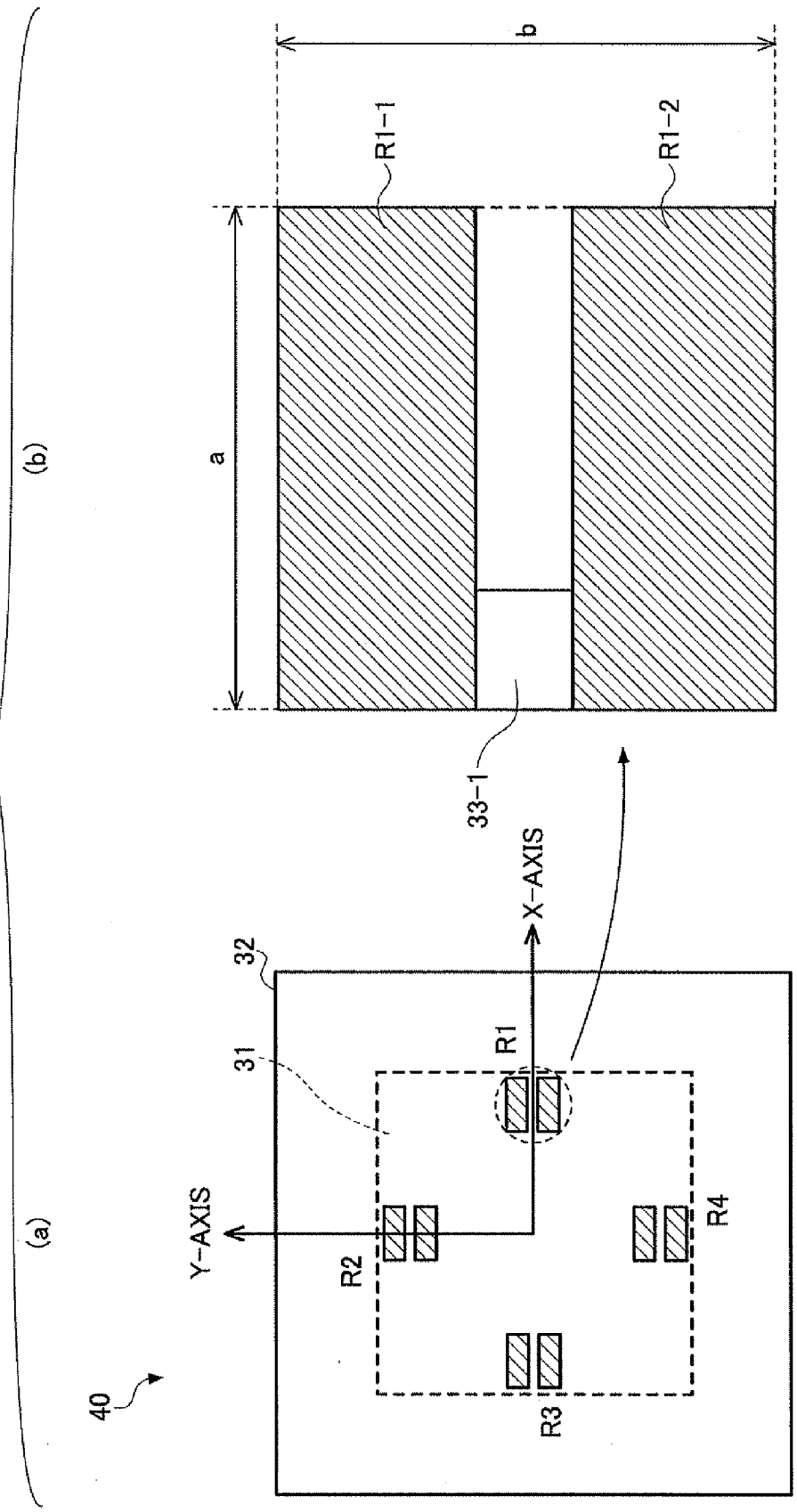
FIG. 20 is a diagram illustrating a structure of a piezoelectric pressure sensor according to a variation of the fourth embodiment of the present invention, where (a) is a plan view illustrating an overall configuration and (b) is a plan view illustrating an arrangement of piezoresistive elements in the piezoresistance part.
Figure 21:
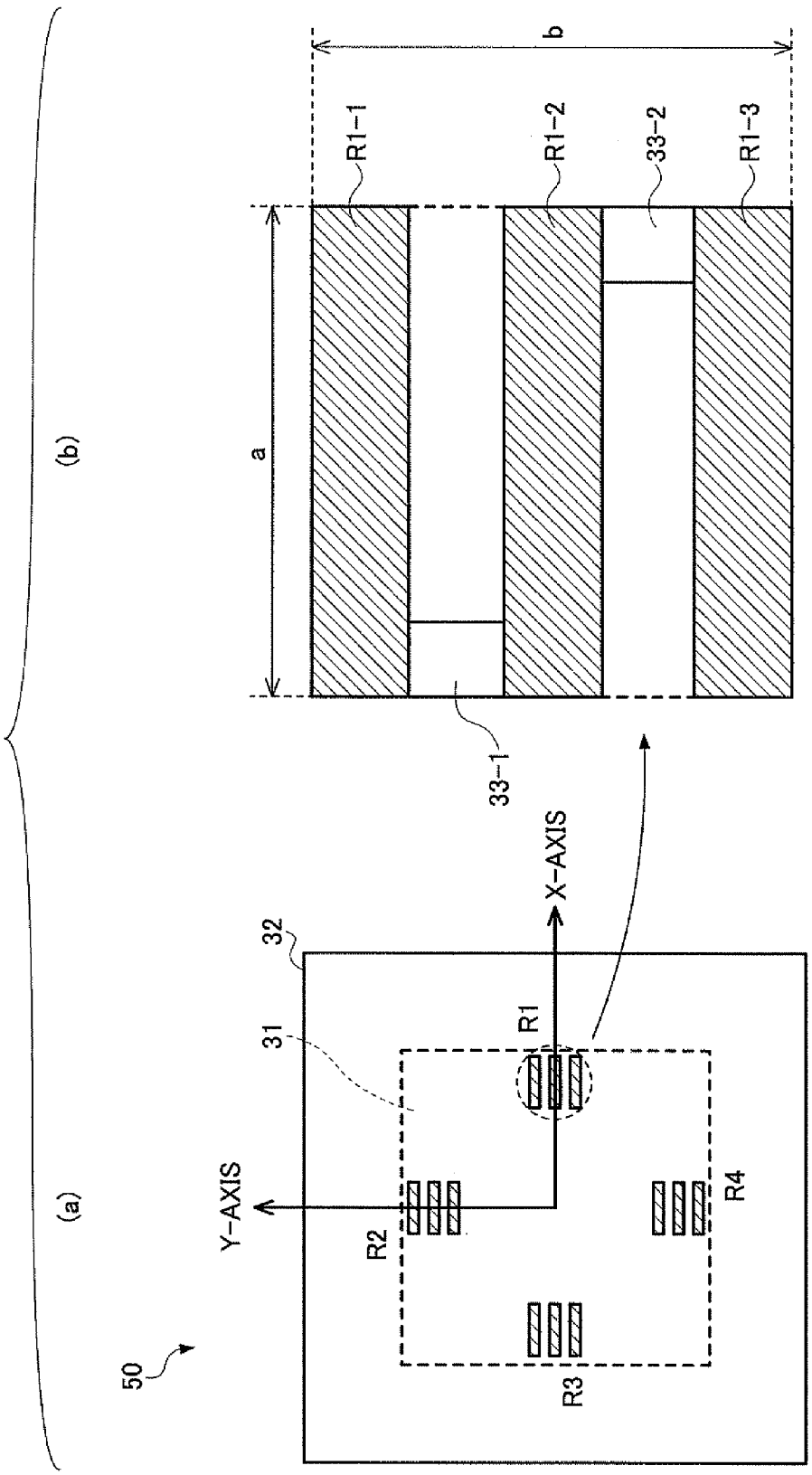
FIG. 21 is a diagram illustrating a structure of a piezoelectric pressure sensor according to another variation of the fourth embodiment of the present invention, where (a) is a plan view illustrating an overall configuration and (b) is a plan view illustrating an arrangement of piezoresistive elements in the piezoresistance part.

In the above-described fourth embodiment, a description is given of the case where each of the piezoresistance parts R1, R2, R3, and R4 has four piezoresistive elements as illustrated in FIG. 13. However, the number of piezoresistive elements is not limited to this. For example, as in a piezoresistive pressure sensor 40 illustrated in FIG. 20, each of the piezoresistance parts R1, R2, R3, and R4 may have two piezoresistive elements. Further, as in a piezoresistive pressure sensor 50 illustrated in FIG. 21, each of the piezoresistance parts R1, R2, R3, and R4 may have three piezoresistive elements. Further, a description is given of the case where the region where a piezoresistive element group forming each of the piezoresistance parts R1, R2, R3, and R4 is placed has a substantially square outline (that is, a=b in (b) of FIG. 13). However, the same effects as in the above-described fourth embodiment may be produced if the regions of the placement of a piezoresistive element group have the same outline and the same area.

A piezoresistive pressure sensor according to an aspect of the present invention may be applied in a wide variety of cases of detecting the pressure of gas or liquid, detecting the pressure of a human pressing operation or the like, etc.

What is claimed is:

1. An electronic apparatus, comprising:
    a sensor unit including a sensing device and configured to transmit detection data acquired with the sensing device;
    a computing device configured to receive the detection data and compute a corrected value of the detection data; and
    a memory containing, together with identification information, correction information for computing the corrected value,
    wherein a characteristic of the corrected value is switched by switching a correcting operation method for computing the corrected value using the correction information contained in the memory in accordance with the identification information contained in the memory by the computing device.

2. The electronic apparatus as claimed in claim 1, wherein a correction accuracy of the corrected value is switched as the characteristic of the corrected value.

3. The electronic apparatus as claimed in claim 1, where the sensor unit includes the memory.

4. A method of correcting detection data, comprising:
receiving detection data acquired with a sensing device; and
computing a corrected value of the detection data,
wherein a characteristic of the corrected value is switched by switching a correcting operation method for computing the corrected value using correction information for computing the corrected value in accordance with identification information read from a memory containing the correction information.

5. A sensor unit, comprising:
a sensing device;
a memory containing, together with identification information, correction information for computing a corrected value of detection data by a computing device receiving the detection data, the detection data being acquired with the sensing device; and
a transmission part configured to transmit the detection data and the correction information and the identification information contained in the memory so that a characteristic of the corrected value is switched by switching a correcting operation method for computing the corrected value using the correction information contained in the memory in accordance with the identification information contained in the memory by the computing device.

* * * * *